US009436207B2

(12) United States Patent
Fukuoka et al.

(10) Patent No.: US 9,436,207 B2
(45) Date of Patent: Sep. 6, 2016

(54) OPERATION DEVICE AND ELECTRIC MOBILITY

(71) Applicant: WHILL Inc., Yokohama-shi, Kanagawa (JP)

(72) Inventors: Muneaki Fukuoka, Kanagawa (JP); Naoto Sakakibara, Kanagawa (JP)

(73) Assignee: WHILL Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 14/624,508

(22) Filed: Feb. 17, 2015

(65) Prior Publication Data

US 2015/0231001 A1 Aug. 20, 2015

(30) Foreign Application Priority Data

Feb. 18, 2014 (JP) ................................ 2014-028702

(51) Int. Cl.

*B62M 1/14* (2006.01)
*G05G 1/04* (2006.01)
*A61G 5/04* (2013.01)
*A61G 5/10* (2006.01)

(52) U.S. Cl.

CPC ................ *G05G 1/04* (2013.01); *A61G 5/046* (2013.01); *A61G 2005/1051* (2013.01); *A61G 2203/14* (2013.01); *Y10T 74/20474* (2015.01)

(58) Field of Classification Search

CPC .................. G05G 1/04; A61G 5/046; A61G 2005/1051; Y10T 74/20474
See application file for complete search history.

(56) References Cited

U.S. PATENT DOCUMENTS 4,590,454 A * 5/1986 Zettergren ........... F16H 59/044 338/128
5,301,568 A * 4/1994 Kono ...................... G05G 5/04 267/150
5,986,645 A * 11/1999 Brooks ................... G05G 5/05 345/157
6,109,130 A * 8/2000 Will ........................ G05G 5/04 340/456

(Continued)

FOREIGN PATENT DOCUMENTS

JP 50-80731 U 12/1976
JP 55-58003 U 4/1980

(Continued)

OTHER PUBLICATIONS

Notice of Rejection with English Translation issued in Japanese Application No. 2014-028702, dated Jan. 14, 2015, by Daisuke Nakamura ( pages).

*Primary Examiner* — Anne Marie Boehler
*Assistant Examiner* — Marlon Arce
(74) *Attorney, Agent, or Firm* — Knobbe, Martens, Olson & Bear, LLP

(57) ABSTRACT

There is provided an operation device provided with: an operation member displaceable by an operator; a two-dimensional support mechanism in which a pair of one-dimensional support mechanisms that individually displaceably supports the operation member 11 in mutually crossing two directions are connected in series; and a pair of potentiometers that individually biases the operation member 11 toward a neutral position of displacement by the respective one-dimensional support mechanisms, in which biasing forces that the pair of potentiometers applies to the operation member against displacement of the operation member are different from each other, and in which a command signal according to the displacement of the operation member of the respective one-dimensional support mechanisms is output.

3 Claims, 10 Drawing Sheets

(56) References Cited

U.S. PATENT DOCUMENTS

| | | | | |
|---|---|---|---|---|
| 6,353,430 | B2 * | 3/2002 | Cheng | 200/6 A |
| 8,684,398 | B1 * | 4/2014 | Nyitray | A61G 5/10 280/250.1 |
| 2014/0180520 | A1 * | 6/2014 | Kume | B60L 15/2036 701/22 |
| 2015/0253975 | A1 * | 9/2015 | Pettigrew | A61G 5/04 715/772 |

FOREIGN PATENT DOCUMENTS

| | | | |
|---|---|---|---|
| JP | H06-56813 | A | 8/1994 |
| JP | 08-322110 | * | 12/1996 |
| JP | 2007-172337 | A | 12/1996 |
| JP | H08-322110 | A | 12/1996 |
| JP | 2001-005545 | A | 1/2001 |

* cited by examiner

OPERATION DEVICE AND ELECTRIC MOBILITY

CROSS-REFERENCE TO RELATED APPLICATIONS

This application is based on Japanese Patent Application No. 2014-028702, the contents of which are incorporated herein by reference in its entirety.

TECHNICAL FIELD

The present disclosure relates to an operation device and an electric mobility.

BACKGROUND ART

Conventionally, there has been known an operation device that subjects an operation member to displacement made by an operator in an arbitrary direction, and outputs various types of command signals according to the displacement (for example, refer to Japanese Unexamined Patent Application, Publication No. 2001-5545).

An operation device disclosed in PTL 1 brings a lower surface of a shaft-like operation member into contact with an upper surface of a member to which an upward biasing force is applied by a spring, and thereby holds the operation member at a neutral position.

SUMMARY

When a command signal is output by displacing the operation member in two directions perpendicular to each other, it is preferable that the operator can respectively recognize a displacement state of the operation member in each direction. As a result of this, adjustment of the displacement state of the operation member to each direction is facilitated, and operability improves.

However, the operation device of PTL 1 holds the operation member at the neutral position by the biasing force of the single spring, and it is not easy for the operator to individually recognize the displacement state of the operation member to each direction. This is because a biasing force received by an operator's hand when the operator displaces the operation member from the neutral position includes only a biasing force in one direction that linearly returns a position of the operation member to the neutral position, which does not allow the operator to individually recognize displacement of the operation member to each direction.

An object of the present disclosure, which has been made in view of the above-mentioned circumstances, is to provide an operation device in which when a command signal is output by displacing an operation member in two directions perpendicular to each other, an operator can individually recognize the displacement of the operation member to each direction to thereby enhance operability, and to provide an electric mobility provided with such an operation device.

In order to achieve the above-described object, the present disclosure provides the following means.

An operation device pertaining to one aspect of the present disclosure is provided with: an operation member displaceable by an operator; a two-dimensional support mechanism in which a pair of one-dimensional support mechanisms that individually displaceably supports the operation member in mutually crossing two directions are connected in series; and a pair of biasing mechanisms that individually biases the operation member toward a neutral position of displacement by each one-dimensional support mechanism, in which biasing forces that the pair of biasing mechanisms applies to the operation member against the displacement of the operation member are different from each other, and in which a command signal according to the displacement of the operation member of each one-dimensional support mechanism is output.

According to the operation device pertaining to one aspect of the present disclosure, when the operator displaces the operation member, displacement in the two directions perpendicular to each other is transmitted to each of the pair of one-dimensional support mechanisms that supports the operation member. The displacement of the operation member transmitted to the pair of one-dimensional support mechanisms is output as the command signal according to the displacement of the operation member of each one-dimensional support mechanism. The biasing force toward the neutral position of the displacement by each one-dimensional support mechanism is applied to the operation member by the pair of biasing mechanisms.

When either one of the two directions displaceably supported by the pair of one-dimensional support mechanisms is included in displacement directions of the operation member by the operator, a biasing force along the one direction is applied to the operation member. Similarly, when the other of the above-mentioned two directions is included in the displacement directions of the operation member by the operator, a biasing force along the other direction is applied to the operation member. By these biasing forces, the operator can individually recognize the displacement direction of the operation member in relation to each of the two directions where the operation member is displaceably supported.

In addition, the biasing forces that the pair of biasing mechanisms applies to the operation member against the displacement of the operation member are different from each other. Therefore, it is easy for the operator to displace the operation member in the direction with smaller biasing force applied to the operation member against the displacement of the operation member, and it becomes hard for the operator to displace the operation member in the direction with larger biasing force applied to the operation member against the displacement of the operation member. Accordingly, output stability of the command signal along the direction where the biasing force applied to the operation member against displacement of the operation member is smaller can be enhanced.

As described above, according to the operation device pertaining to one aspect of the present disclosure, when the command signal is output by displacing the operation member in the two directions perpendicular to each other, the operator can individually recognize the displacement of the operation member toward each direction to thereby enhance operability.

In the configuration, one of the one-dimensional support mechanisms may be provided with a rail member that linearly movably supports the operation member along either of the two directions.

In a manner as described above, the operator can transmit the displacement of the operation member to the two-dimensional support mechanism by linearly moving the operation member along the rail member.

In the above description, the other one-dimensional support mechanism may be provided with a swing member that supports the rail member swingably around an axis line parallel to the rail member.

In a manner as described above, the rail member is swung around a swing shaft parallel to the rail member while linearly moving the operation member in a direction along the rail member, and thereby the operation member can be individually displaced in the crossing two directions.

In the above description, the biasing force that one biasing mechanism biasing the operation member in the direction along the rail member applies to the operation member against the displacement of the operation member may be set to be larger than the biasing force that the other biasing mechanism biasing the swing member in a swing direction of the rail member applies to the operation member against the displacement of the operation member.

In a manner as described above, it becomes easy for the operator to displace the operation member in the swing direction of the rail member, and becomes hard to displace the operation member in the direction along the rail member. Accordingly, output stability of the command signal along the swing direction of the rail member can be enhanced.

The operation device of the aspect may have a configuration in which the two directions are a travel direction and a vehicle-width direction of an electric mobility provided with at least one electric drive wheel, and in which the command signal is a signal to command a travel speed and a steering direction of the electric mobility.

According to the configuration, when the command signal is output by displacing the operation member in the travel direction and the vehicle-width direction perpendicular to each other, the operator can individually recognize the displacement of the operation member toward each direction to thereby enhance operability of the electric mobility.

The electric mobility pertaining to one aspect of the present disclosure is provided with: the operation device having the above-described configuration; a rear wheel and a front wheel that are arranged to be spaced apart from each other in a travel direction, and at least either of which is an electric drive wheel; a vehicle body frame that rotatably supports the front wheel and the rear wheel around each axle; a seat that is attached to the vehicle body frame, and is arranged above a position adjacent to the rear wheel, the position being located between the front wheel and the rear wheel; and a handle that is attached to the vehicle body frame, and is arranged at a side of the operator in a state where he is sitting on the seat, in which the operation device is provided at the handle.

In a manner as described above, the electric mobility can be provided in which the operator can appropriately operate a travel speed and a steering direction, respectively in a state where the operator places his hand on the operation device provided at the handle arranged at a side of him in a state where he sits on the seat.

According to the present disclosure, there can be provided the operation device in which when the command signal is output by displacing the operation member in two directions perpendicular to each other, the operator can individually recognize displacement of the operation member toward each direction to thereby enhance operability, and the electric mobility provided with the operation device.

DESCRIPTION OF EMBODIMENTS

An electric mobility 100 of one embodiment of the present disclosure will be explained hereinafter with reference to drawings.

Figure 1:
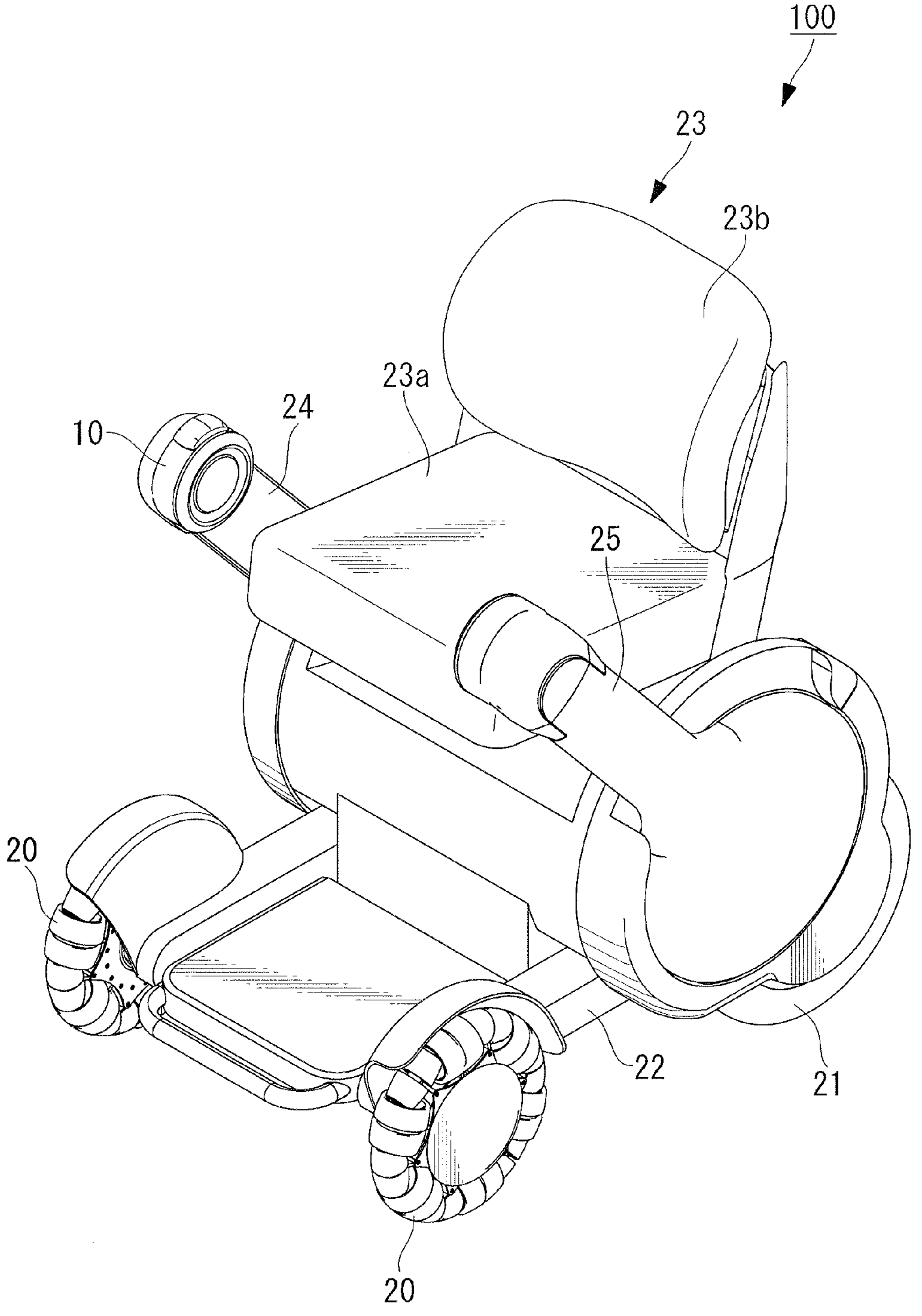
FIG. 1 is a perspective view of an electric mobility of the embodiment showing a state where a pair of handles is arranged at an operation position.
Figure 2:
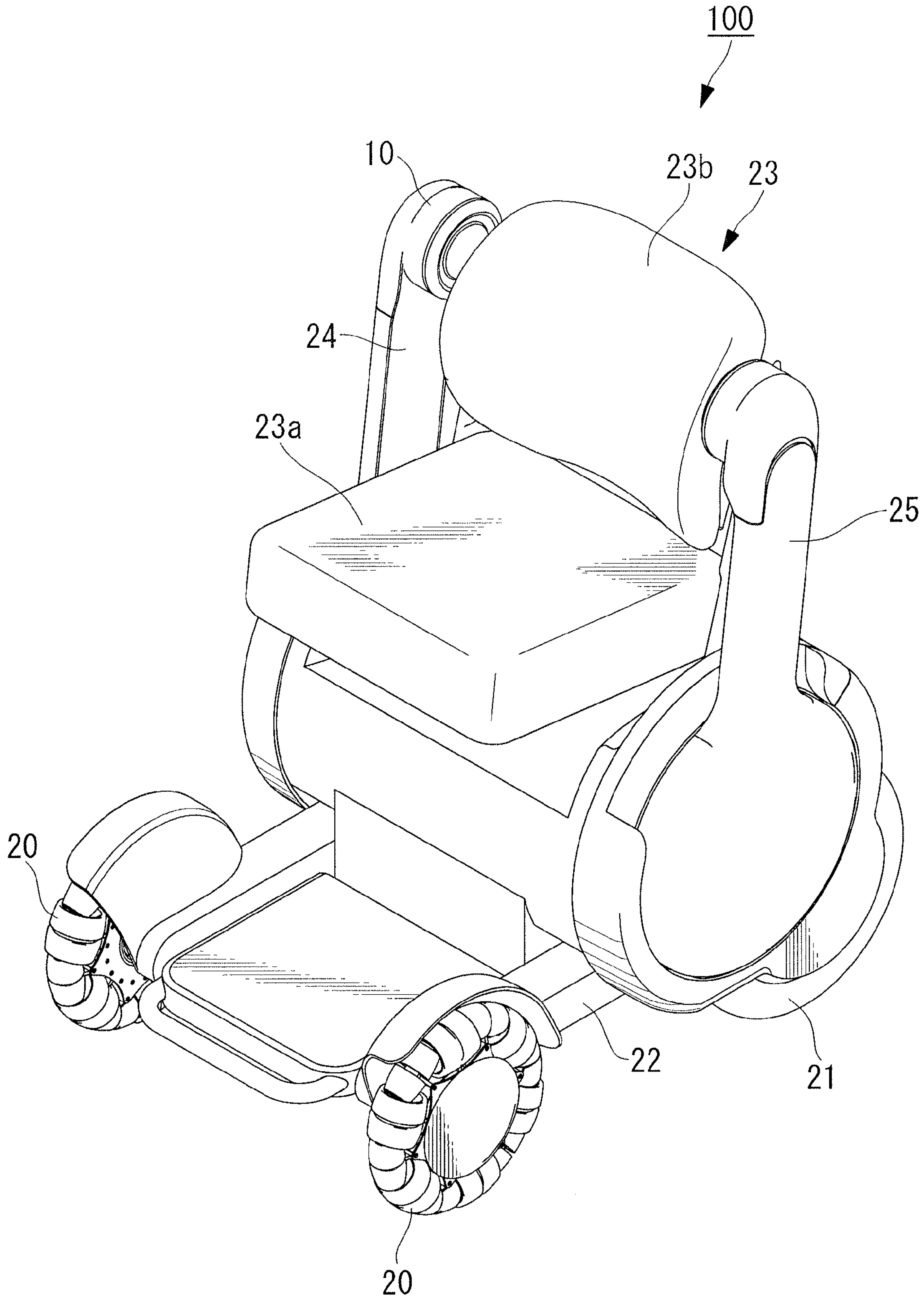
FIG. 2 is a perspective view of the electric mobility of the embodiment showing a state where the pair of handles is arranged at a getting on/off position.

As shown in FIGS. 1 and 2, the electric mobility 100 of the embodiment is provided with: an operation device 10; front wheels 20; rear wheels 21; a vehicle body frame 22; a seat 23; and a pair of handles 24, 25.

Figure 3:
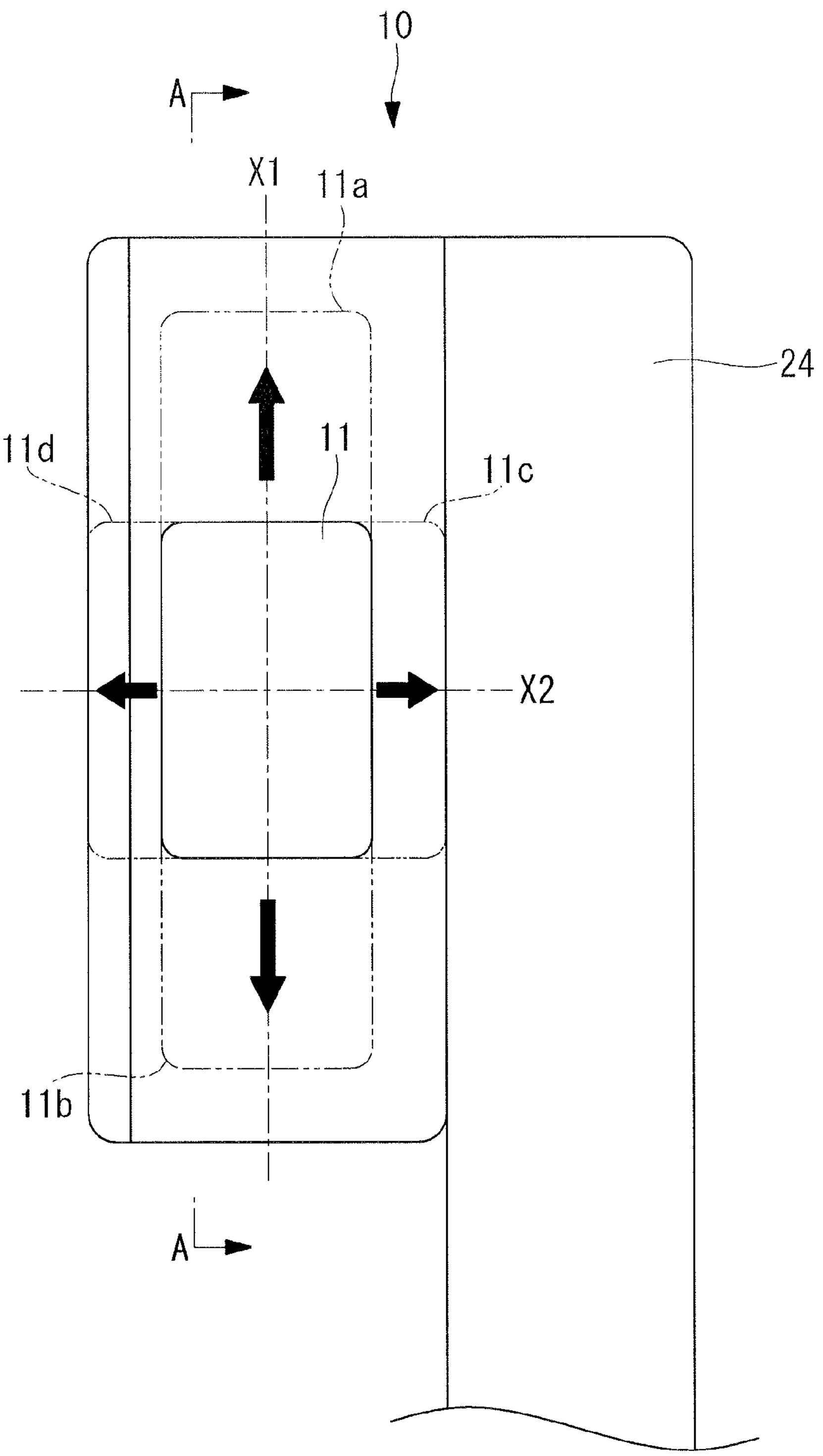
FIG. 3 is a plan view showing an operation device of the embodiment.

As shown in FIG. 3, the operation device 10 is the device for operating a travel speed and a steering direction of the electric mobility 100, and has an operation member 11 displaceable by an operator of the electric mobility 100. The operator of the electric mobility 100 outputs command signals to command the electric mobility 100 about the travel speed and the steering direction by displacing the operation member 11 along a travel direction and a vehicle-width direction.

Figure 4:
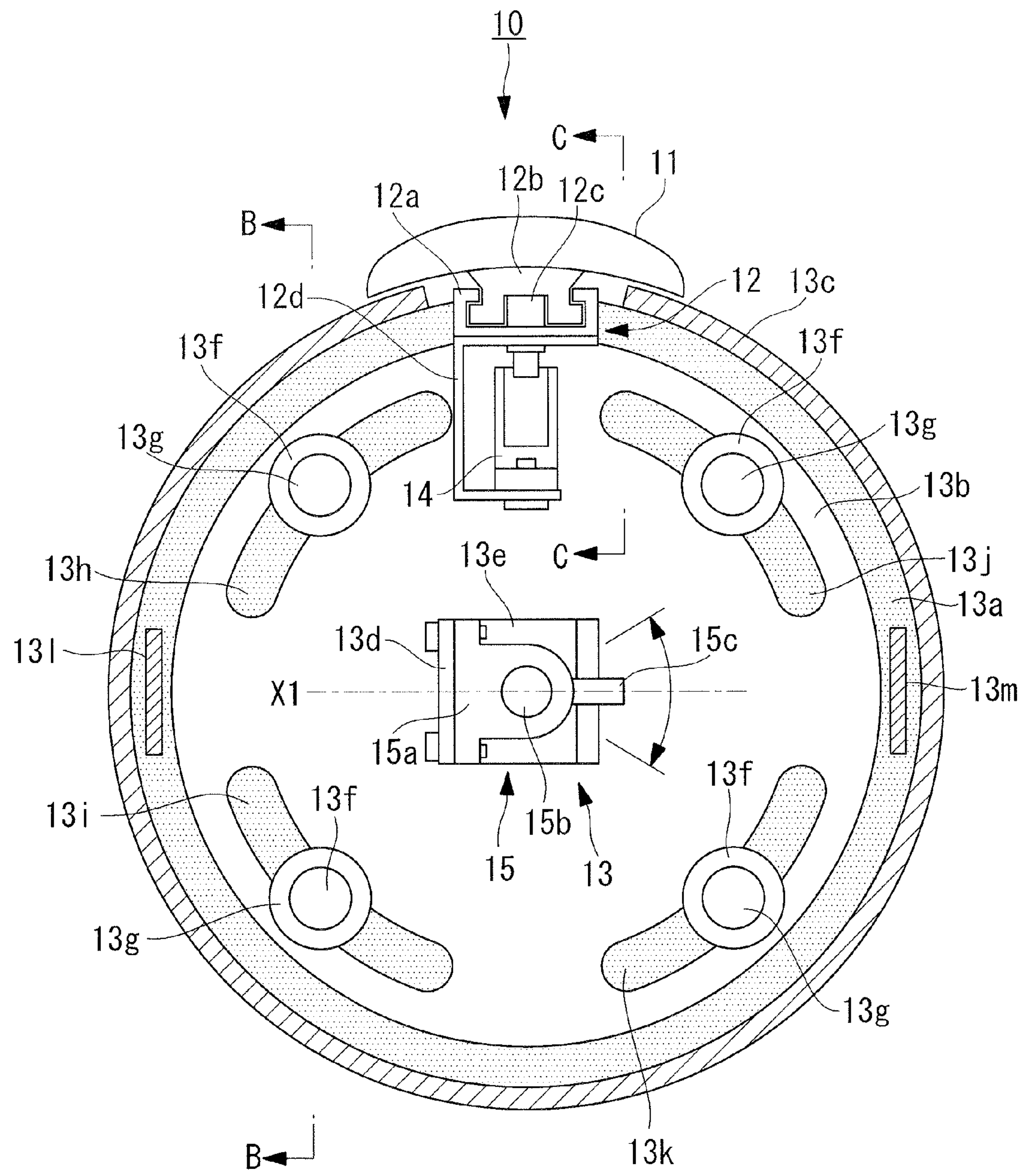
FIG. 4 is a cross-sectional view of the operation device taken in a direction of arrows A-A shown in FIG. 3, and is the view showing a neutral position of the operation member.

As shown in FIG. 4, when outputting the command signals to control the electric mobility 100 by displacing the operation member in two directions of the travel direction and the steering direction perpendicular to each other, the operation device 10 is provided with a pair of potentiometers 14, 15 that applies a biasing force along each direction to the operation member so that the operator can individually recognize displacement of the operation member 11 toward each direction. As will be mentioned later, the potentiometers 14, 15 serve as biasing mechanisms each having a built-in spring that generates a biasing force to bias the operation member 11 toward a neutral position. A detailed configuration of the operation device 10 will be mentioned later.

First of all, each configuration of the electric mobility 100 will be explained.

As shown in FIG. 1, in the electric mobility 100, the front wheels 20 and the rear wheel 21 are arranged to be spaced apart from each other in the travel direction, and at least either of them are electric drive wheels using an electric motor (not shown) as a power source. For example, two rear wheels are electric drive wheels, and two front wheels are driven wheels. Alternatively, the two rear wheels are the electric drive wheels, and the two front wheels are drive wheels to which a drive force is transmitted by a belt etc. from the two rear wheels. In addition, the respective two front wheels and two rear wheels may be set to be electric drive wheels.

The front wheels 20 are omnidirectional moving wheels provided with a plurality of rollers each having an axis line perpendicular to a radial direction of the wheel. When the front wheels 20 receive a force in the vehicle-width direction, the plurality of rollers rotate around the respective axis lines, and thereby the front wheels 20 can move along the vehicle-width direction. A vehicle (omnidirectional moving vehicle) provided with the front wheels 20, which are the omnidirectional moving wheels, can omnidirectionally move with respect to a ground contact surface of the vehicle by combining movement in the vehicle-width direction and movement in the travel direction.

The vehicle body frame 22 rotatably supports the front wheels 20 and the rear wheels 21 around respective axles. The electric motor (not shown) serving as the power source of the drive wheels, the seat 23, and the pair of handles 24, 25 are attached to the vehicle body frame 22 in addition to the front wheels 20 and the rear wheels 21.

The seat 23 is the seat on which the operator of the electric mobility 100 sits, and is provided with a seat surface 23*a* and a back rest 23*b*. The seat 23 is arranged above a position adjacent to the rear wheels 21, the position being located between the front wheels 20 and the rear wheels 21. A slide member (illustration is omitted) that is movably attached to a rail member (illustration is omitted) that is attached to an upper part of the vehicle body frame 22 and extends in the travel direction is attached under the seat surface 23*a*. The slide member is moved to the rail member and is fixed by a locking mechanism (illustration is omitted), and thereby the seat surface 23*a* with respect to the vehicle body frame 22 can be fixed to an arbitrary position.

The pair of handles 24, 25 includes the handle 24 arranged at a right side in the travel direction of the electric mobility 100, and the handle 25 arranged at a left side therein. The pair of handles 24, 25 is arranged at both sides of the operator in a state where he is sitting on the seat 23. The pair of handles 24, 25 swings around a swing shaft parallel to the axles of the front wheels 20 and the rear wheels 21. The pair of handles 24, 25 can be fixed to either of two positions in a state of being arranged at an operation position shown in FIG. 1, and a state of being arranged at a getting on/off position shown in FIG. 2. It is also possible to fix either one of the pair of handles 24, 25 to the operation position, and to fix the other to the getting on/off position in addition to the states shown in FIGS. 1 and 2.

The operation device 10 is provided at a tip of either one of the pair of handles 24, 25. Although in an example shown in FIGS. 1 and 2, the operation device 10 is provided at the tip of the handle 24 arranged at the right side of the electric mobility 100, it may be provided at the tip of the handle 25 arranged at the left side thereof.

Next, a configuration of the operation device 10 of the embodiment will be explained with reference to the drawings.

Figure 5:
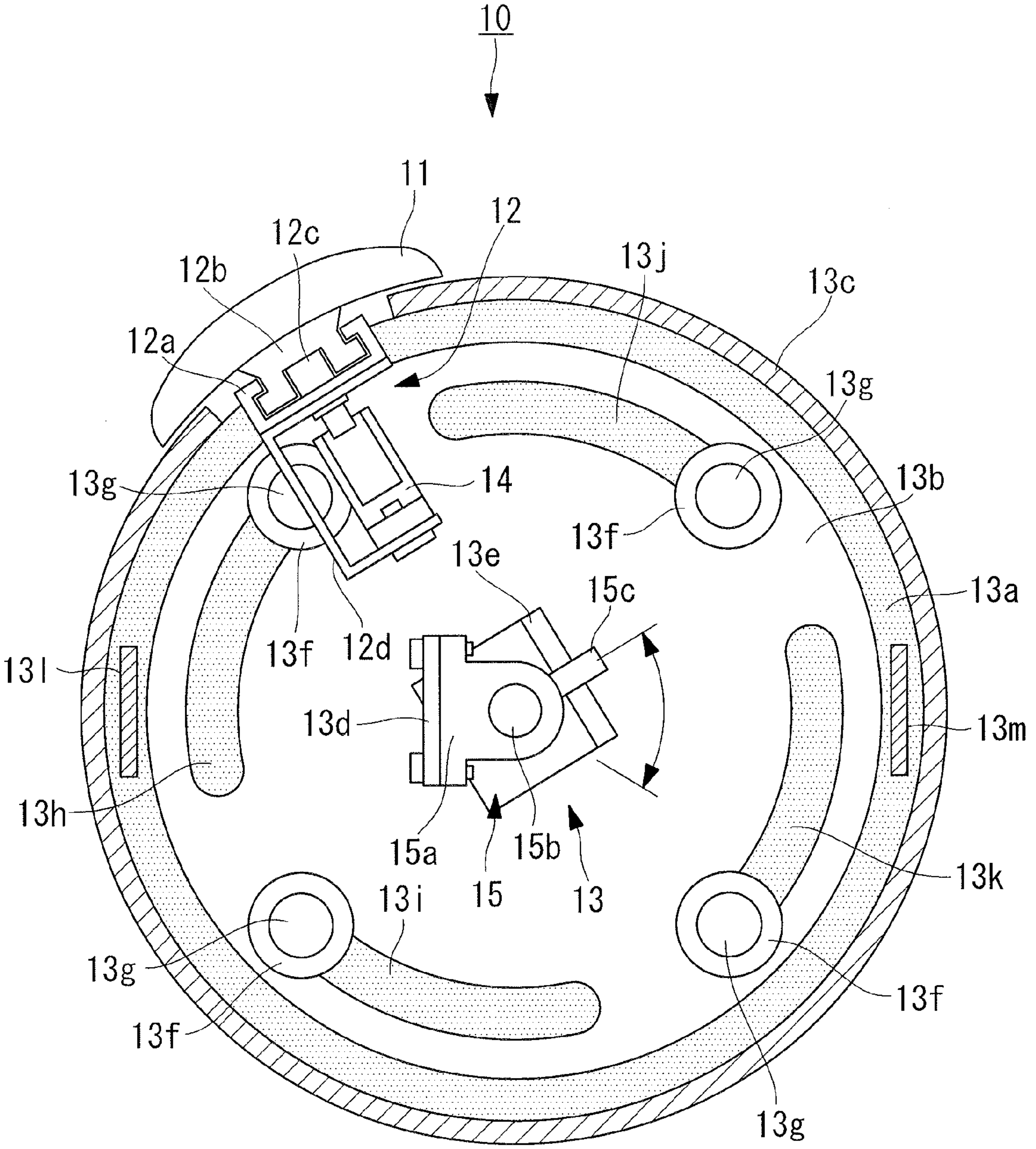
FIG. 5 is a cross-sectional view of the operation device taken in the direction of the arrows A-A shown in FIG. 3, and is the view showing a state where an operation member is displaced from the neutral position.

As shown in FIGS. 4 and 5, the operation device 10 is provided with: the operation member 11; a two-dimensional support mechanism in which a pair of one-dimensional support mechanisms 12, 13 is connected in series; and the pair of potentiometers (biasing mechanisms) 14, 15.

The two-dimensional support mechanism is the mechanism that individually displaceably supports the operation member 11 in mutually crossing two directions of an axis line X1 direction and an axis line X2 direction.

The potentiometers 14, 15 are provided with swing members 14*c*, 15*c* that can swing from a central neutral position to both sides, and they are modules that output voltage signals according to swing angles of the swing members 14*c*, 15*c*. In addition, the potentiometers 14, 15 are the modules that function as biasing mechanisms provided with springs (illustration is omitted) that bias the swing members toward the neutral position.

Hereinafter, each portion of the operation device 10 will be explained.

First of all, the operation member 11 will be explained.

As shown in FIG. 3, the operation device 10 of the embodiment is provided with the operation member 11 displaceable by the operator. The operation member 11 is held at the neutral position shown by a continuous line in FIG. 3 by the biasing forces generated by the pair of potentiometers 14, 15. The operator can displace the operation member 11 at any position between positions 11*a* and 11*b* in the axis line X1 direction coincident with the travel direction. In addition, the operator can displace the operation member 11 to any position between positions 11*c* and 11*d* in the axis line X2 direction coincident with the vehicle-width direction. The operator can displace the operation member 11 to an arbitrary position by combining the displacement along the axis line X1 and the displacement along the axis line X2.

When the operation member 11 is displaced to the position 11*a* of FIG. 3, the operation device 10 outputs a speed command signal to advance the electric mobility 100 at a predetermined maximum speed. In addition, when the operation member 11 is displaced to the position 11*b* of FIG. 3, the operation device 10 outputs a speed command signal to reverse the electric mobility 100 at a predetermined maximum speed.

When the operation member 11 is displaced to the position 11*c* of FIG. 3, the operation device 10 outputs a steering command signal to turn the electric mobility 100 in a right direction at a predetermined maximum steering angle. In addition, when the operation member 11 is displaced to the position 11*d* of FIG. 3, the operation device 10 outputs a steering command signal to turn the electric mobility 100 in a left direction at a predetermined maximum steering angle.

Next, the one-dimensional support mechanism 12 will be explained.

As shown in FIG. 4, the one-dimensional support mechanism 12 is provided with: a roll rail (rail member) 12*a*; a roll slide (slide member) 12*b*; a roll cap (slide member) 12*c*; and a roll bracket 12*d*.

Figure 7:
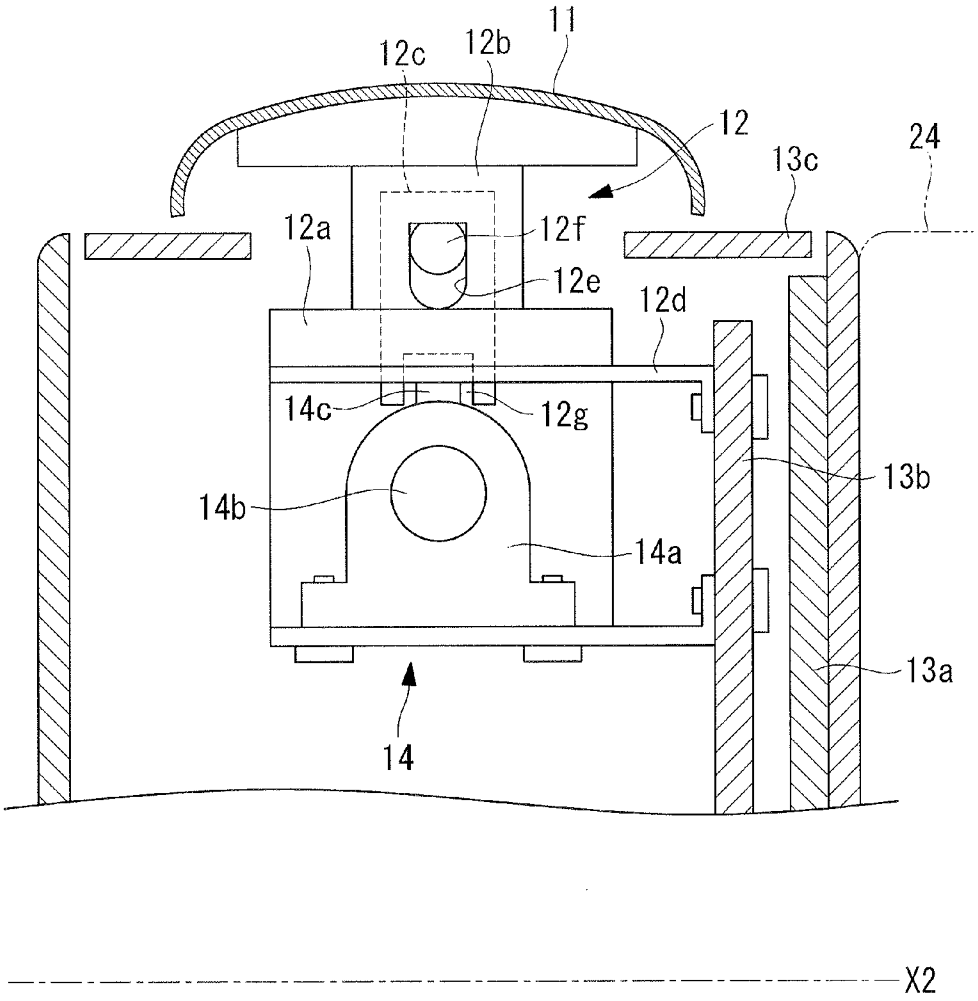
FIG. 7 is a cross-sectional view of the operation device taken in a direction of arrows C-C shown in FIG. 4, and is the view showing the neutral position of the operation member.
Figure 8:
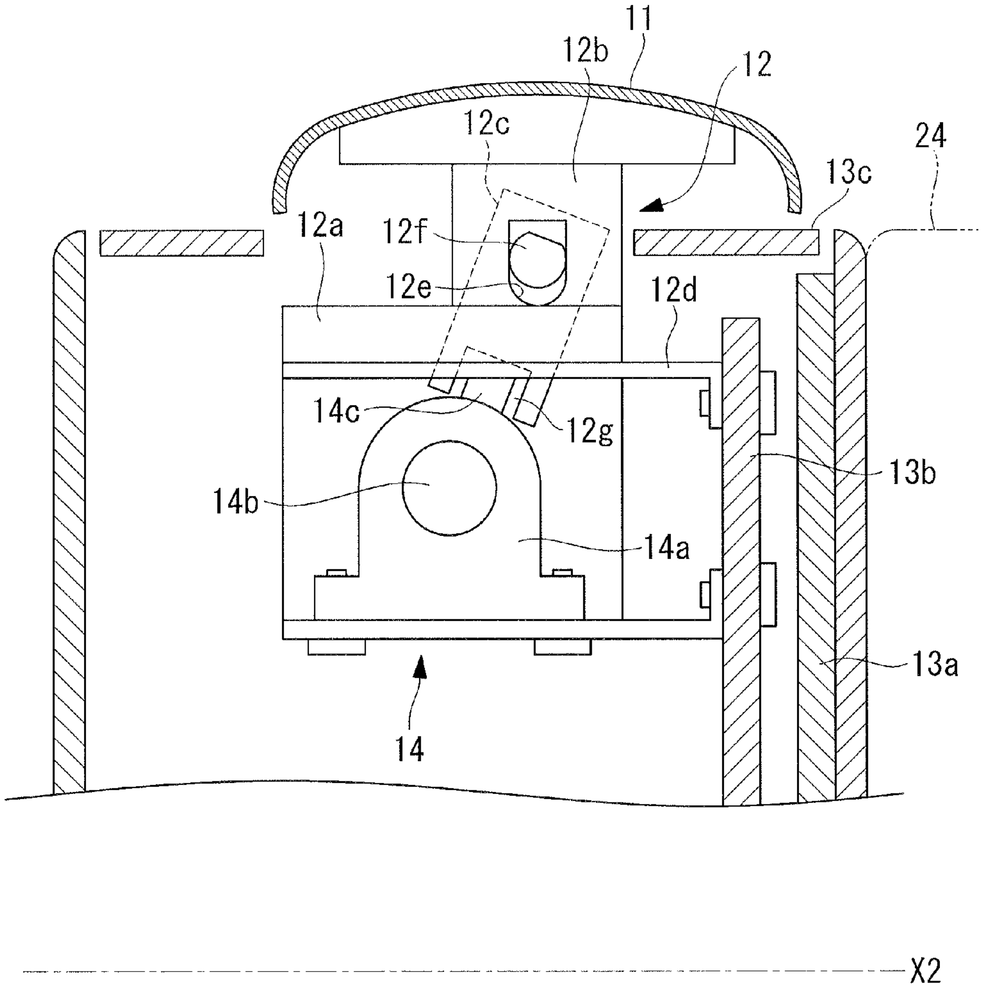
FIG. 8 is a cross-sectional view of the operation device taken in the direction of the arrows C-C shown in FIG. 4, and is the view showing a state where the operation member is displaced from the neutral position.

As shown in FIG. 7, the roll rail 12*a* is a member that extends along the axis line X2, and is attached to a pitch plate 13*b* through the roll bracket 12*d*. As shown in FIGS. 4, 7, and 8, the roll slide 12*b* is attached to the operation member 11, and is movably attached to the roll rail 12*a* along the axis line X2.

Figure 9:
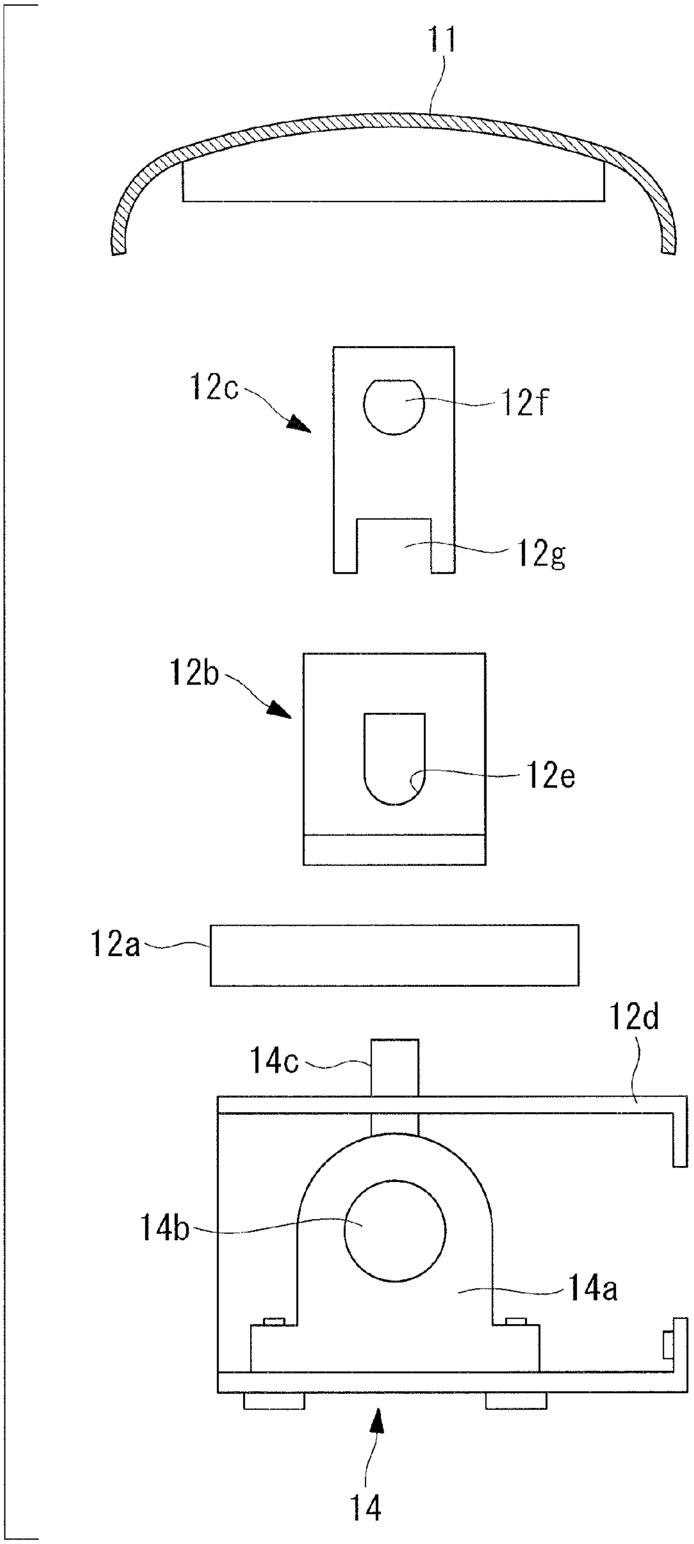
FIG. 9 is an exploded view of a one-dimensional support mechanism.

As shown in an exploded view of FIG. 9, a groove portion 12*e* is provided in the roll slide 12*b*, and a projecting portion 12*f* is provided at the roll cap 12*c*. A through-hole (illustration is omitted) extending in a direction perpendicular to the axis line X2 direction where the roll rail 12*a* extends is provided in the roll slide 12*b*, and the roll cap 12*c* is inserted in the through-hole. After inserting the roll cap 12*c* in the through-hole of the roll slide 12*b* to integrate them into one member (slide member), an upper surface of the roll slide 12*b* and a lower surface of the operation member 11 are joined to each other. As a result of this, the roll cap 12*c* becomes a state of being inserted in the roll slide 12*b*, and the projecting portion 12*f* can move along the groove portion 12*e*.

As shown in FIG. 7, the potentiometer (biasing mechanism) 14 is attached to the pitch plate 13*b* through the roll bracket 12*d*. The potentiometer 14 is provided with a body 14*a*, and a shaft-like swing member 14*c* that swings around a swing shaft 14*b*. The swing member 14*c* is arranged so as to project to the roll rail 12*a* side through an opening hole (illustration is omitted) provided in the roll bracket 12*d*.

As shown in FIG. 7, the swing member 14*c* of the potentiometer 14 becomes a state of being inserted in a gap portion 12*g* of the roll cap 12*c* in a state where the one-dimensional support mechanism 12 is assembled. In a manner as described above, the roll slide 12*b* attached to the operation member 11 moves along the axis line X2 along with the operator moving the operation member 11 along the axis line X2. The roll cap 12*c* inserted inside the roll slide 12*b* moves along the axis line X2 along with the movement of the roll slide 12*b*. Additionally, the swing member 14*c* swings around the swing shaft 14*b* along with the movement of the roll cap 12*c*.

A state of the roll cap 12*c* inserted inside the roll slide 12*b* is shown by dotted lines in FIGS. 7 and 8. As mentioned above, the projecting portion 12*f* of the roll cap 12*c* is in a state movable along the groove portion 12*e* of the roll slide 12*b*. When the operation member 11 moves from the neutral position shown in FIG. 7 to a displacement position shown in FIG. 8, the projecting portion 12*f* moves from an upper side to a lower side of the groove portion 12*e*. Additionally, the swing member 14*c* swings clockwise in FIG. 7 by a force of an operator's hand transmitted through the gap portion 12*g*.

In a manner as described above, the one-dimensional support mechanism 12 provided with the roll slide 12*b* and the roll cap 12*c* (slide member) transmits to the potentiometer 14 the displacement along the axis line X2 of the operation member 11.

When the operation member 11 of the neutral position in the axis line X2 direction shown in FIG. 7 is displaced by the operator, and moves to a displacement position in the axis line X2 direction shown in FIG. 8, the potentiometer 14 generates a biasing force that biases the operation member 11 toward the neutral position. The spring (illustration is omitted) incorporated inside the body 14*a* of the potentiometer 14 generates the biasing force.

Next, the one-dimensional support mechanism 13 will be explained.

As shown in FIG. 4, the one-dimensional support mechanism 13 is provided with a base plate 13*a*, and a cylindrical swing member in which a pitch cover 13*c* is assembled to the pitch plate 13*b* by a fixture (illustration is omitted). The base plate 13*a* is a plate-like member arranged on a flat surface perpendicular to the axis line X2 along the vehicle-width direction of the electric mobility 100. The swing member is arranged coaxially with the base plate 13*a*, and can swing around the axis line X2. As shown in FIGS. 4 and 5, the operation member 11 is arranged in a state of projecting from an opening hole provided in a part of an outer peripheral surface of the pitch cover 13*c*.

Figure 6:
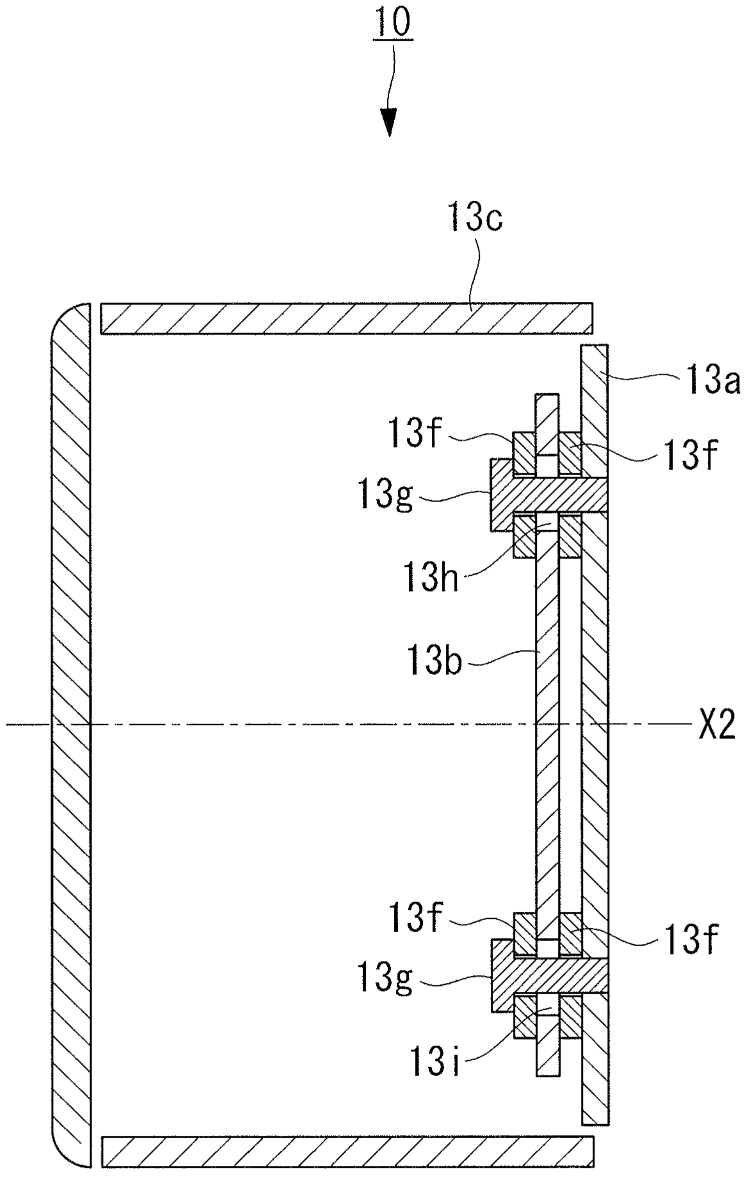
FIG. 6 is a cross-sectional view of the operation device taken in a direction of arrows B-B shown in FIG. 4.

As shown in FIG. 6, fastening bolts 13*g* are fastened to the base plate 13*a* attached to the handle 24. The fastening bolts 13*g* are inserted in slits 13*h*, 13*i* provided in the pitch plate 13*b* in a state of sandwiching resin washers 13*f* at both sides of the pitch plate 13*b*. As shown in FIG. 4, the fastening bolts 13*g* are inserted also in slits 13*j*, 13*k* in a state of sandwiching the washers 13*f* at both sides of the pitch plate 13*b*.

As described above, the resin washers 13*f* are sandwiched at the both sides of the pitch plate 13*b*, and thereby the pitch plate 13*b* swings around the axis line X2 with respect to the base plate 13*a* in a state with relatively little friction.

The pitch plate 13*b* and the pitch cover 13*c* are fastened by fixtures (illustration is omitted) in a plurality of fastening points, which are not shown. In addition, the pitch cover 13*c* is not coupled to the base plate 13*a*. Accordingly, the swing member in which the pitch cover 13*c* has been assembled to the pitch plate 13*b* can swing around the axis line X2 with respect to the base plate 13*a*.

The base plate 13*a* is molded integrally with a pair of stays 131, 13*m* shown in FIGS. 4 and 5. The pair of stays 131, 13*m* extends in the axis line X2 direction, and a base bracket 13*d* is attached to the stays. In addition, the potentiometer 15 (biasing mechanism) is attached to the base bracket 13*d*. As described above, the potentiometer 15 is attached in a state of being fixed to the base plate 13*a*.

As explained above, the one-dimensional support mechanism 12 displaceably supports the operation member 11 in the axis line X2 direction with respect to the pitch plate 13*b*. In addition, the one-dimensional support mechanism 13 displaceably supports the operation member 11 in the axis line X1 direction (the swing direction around the axis line X2) with respect to the base plate 13*a*. The one-dimensional support mechanism 13 supports the one-dimensional support mechanism 12 including the pitch plate 13*b* with respect to the base plate 13*a*. As described above, the one-dimensional support mechanisms 12 and 13 are connected in series to the base plate 13*a*. The two-dimensional support mechanism is formed with these pair of one-dimensional support mechanisms 12 and 13.

Next, the potentiometer 15 will be explained.

As shown in FIGS. 4 and 5, the potentiometer 15 is provided with a body 15*a*, and a shaft-like swing member 15*c* that swings around a swing shaft 15*b*. The swing member 15*c* is arranged in a state of being sandwiched in a groove provided in a pitch bracket 13*e* attached to the pitch plate 13*b*. The pitch bracket 13*e* attached to the pitch plate 13*b* swings around the axis line X2, and thereby the swing member 15*c* swings around the swing shaft 15*b*. A range near the swing member 15*c* shown by an arrow in FIGS. 4 and 5 is a range of a swing angle at which the swing member 15*c* can swing around the axis line X2.

When the operation member 11 moves from the neutral position in the axis line X1 direction shown in FIG. 4 to a displacement position shown in FIG. 5, the pitch plate 13*b* swings to the base plate 13*a* along with the swing in the axis line X2 of the operation member 11. The pitch plate 13*b* swings because the operation member 11 is supported by the pitch plate 13*b* by the one-dimensional support mechanism 12.

Along with the swing of the pitch plate 13*b*, the pitch bracket 13*e* attached to the pitch plate 13*b* swings, and thereby swings the swing member 15*c* of the potentiometer 15 fixed to the base plate 13*a*.

In a manner as described above, the swing member in which the pitch cover 13*c* has been assembled to the pitch plate 13*b* transmits displacement (displacement along the axis line X1) around the axis line X2 of the operation member 11 to the potentiometer 15 corresponding to the one-dimensional support mechanism 13.

When the operation member 11 of the neutral position in the axis line X1 direction shown in FIG. 4 is displaced by the operator, and moves to a displacement position in the axis line X1 direction shown in FIG. 5, the potentiometer 15 generates a biasing force that biases the operation member 11 toward the neutral position. The biasing force is applied by a spring (not shown) incorporated inside the body 15*a* of the potentiometer 15.

Next, the potentiometer 14 will be explained.

The potentiometer 14 is a module that outputs a voltage value according to a swing angle of the swing member 14*c* from the neutral position. Similarly, the potentiometer 15 is a module that outputs a voltage value according to a swing angle of the swing member 15*c* from the neutral position. The swing angle of the swing member 14*c* is the angle according to the displacement of the operation member 11 in the axis line X2 direction (vehicle-width direction) of the operation member 11. Similarly, the swing angle of the swing member 15*c* is the angle according to the displacement of the operation member 11 in the axis line X1 direction (travel direction) of the operation member 11.

Figure 10:
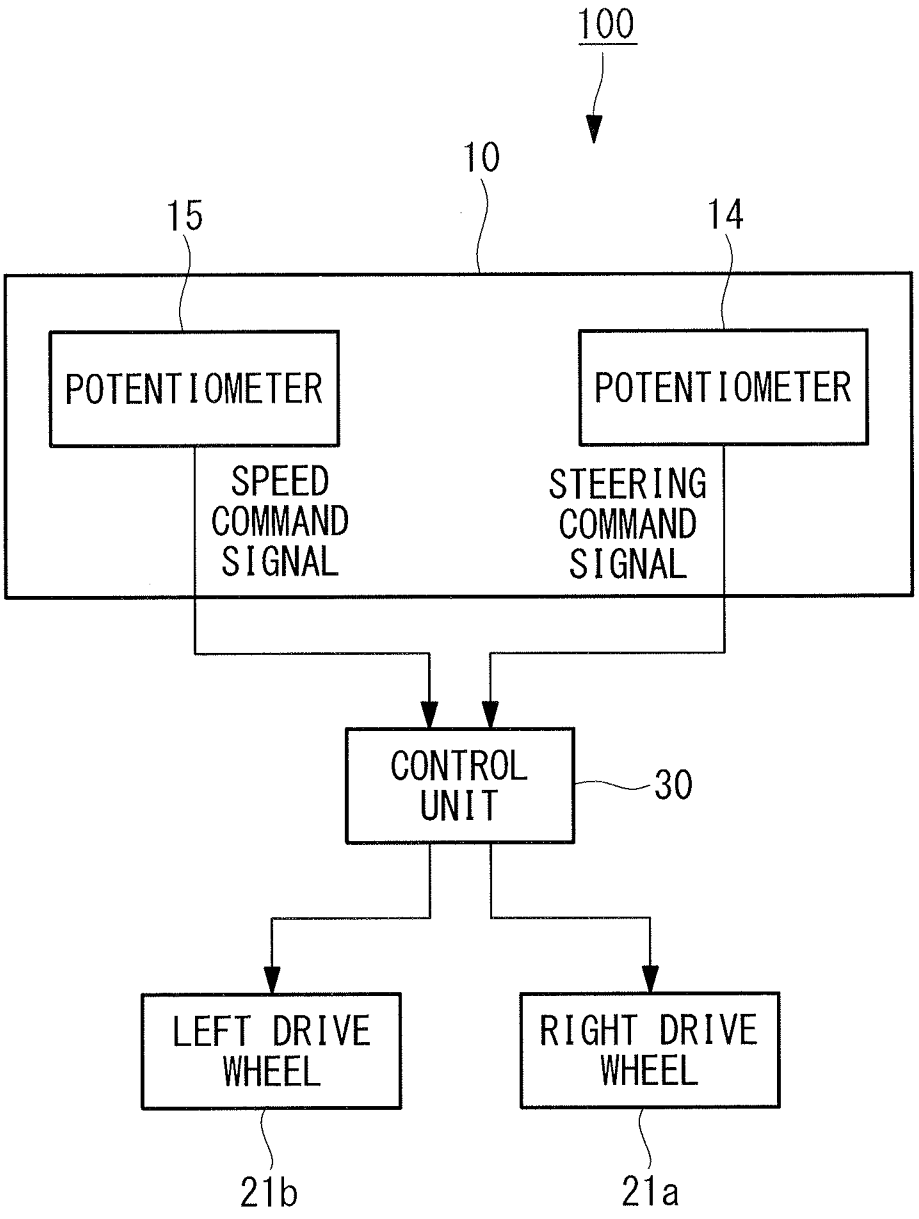
FIG. 10 is a block diagram showing a control configuration of the electric mobility of the embodiment.

As shown in FIG. 10, the voltage value output from the potentiometer 14 is transmitted to a control unit 30 (not shown) as a steering command signal to command the steering direction of the electric mobility 100. Similarly, the voltage value output from the potentiometer 15 is transmitted to the control unit 30 as a speed command signal to command the travel speed of the electric mobility 100.

As described above, the potentiometers 14, 15 output the command signals according to the displacement of the operation member 11 of the one-dimensional support mechanisms 12, 13.

The springs with which the respective potentiometers 14, 15 of the embodiment are provided have the same magnitude of biasing forces generated against displacement of the swing angles from the neutral position of the swing members 14*c*, 15*c*. That is, if the displacement of the swing angles from the neutral position is the same, the biasing forces that the springs generate to the swing members 14*c*, 15*c* are the same as each other. As described above, the biasing forces generated by the springs are set to be the same, thereby the same types of modules can be used as the potentiometers 14, 15, thus contributing to cost reduction.

As described above, although the biasing forces generated by the springs with which the potentiometers 14 and 15 are provided are the same against the displacement of the swing angles, biasing forces that these springs apply to the operation member 11 against the displacement of the operation member 11 are different from each other. Specifically, even if the displacement of the swing angles from the neutral position is the same, the biasing force that the potentiometer 14 applies to the operation member 11 in the vehicle-width direction (axis line X2 direction) is larger than the biasing force that the potentiometer 15 applies to the operation member 11 in the travel direction (axis line X1 direction).

A difference is caused in the magnitude of the biasing forces as described above since positions of the swing shafts of the potentiometers with respect to the position of the operation member 11 are different from each other. As shown in FIGS. 4 and 5, the swing shaft with respect to the operation member 11 in the potentiometer 15 is located farther than that in the potentiometer 14. Accordingly, since a moment distance of the potentiometer 14 is shorter, the biasing force that the potentiometer 14 applies to the operation member 11 in the vehicle-width direction (axis line X2 direction) becomes larger when the displacement of the swing angles from the neutral position is the same.

Next, a control configuration of the electric mobility 100 of the embodiment will be explained.

As shown in FIG. 10, the control unit 30 controls an electric motor (not shown) that drives a right drive wheel 21*a* and an electric motor (not shown) that drives a left drive wheel 21*b*, which constitute the rear wheels 21, based on the steering command signal transmitted from the potentiometer 14, and the speed command signal transmitted from the potentiometer 15.

When the speed command signal is transmitted, the control unit 30 generates a speed control signal to rotate each of the right drive wheel 21*a* and the left drive wheel 21*b* in a same direction at a uniform speed according to the speed command signal. Since the speed control signal is a signal to control the travel speed, it is a control signal for rotating each drive wheel in the same direction at the uniform speed.

Meanwhile, when the steering command signal is transmitted, the control unit 30 generates a steering control signal to rotate each of the right drive wheel 21*a* and the left drive wheel 21*b* in different directions at a uniform speed according to the steering command signal. Since the steering control signal is a signal to control the steering direction, it is a control signal for rotating each drive wheel in the different directions at the uniform speed. For example, when a steering command signal to turn in the right direction is transmitted from the operation device 10, the left drive wheel 21*b* is rotated in an advance direction, and the right drive wheel 21*a* is rotated in a reverse direction.

The control unit 30 that has generated the speed control signal and the steering control signal as described above transmits the control signals to each drive wheel, after superposing the speed control signal and the steering control signal.

When the command signal transmitted from the operation device 10 to the control unit 30 is only the speed command signal (when the operation member 11 is located at the neutral position in the vehicle-width direction), the control unit 30 controls each drive wheel so that the electric mobility 100 is advanced straight or reversed without being steered from side to side.

In addition, when the command signal transmitted from the operation device 10 to the control unit 30 is only the steering command signal (when the operation member 11 is located at the neutral position in the travel direction), the control unit 30 controls each drive wheel so that the electric mobility 100 rotates in the right or left direction on the spot to switch the steering direction without being advanced and reversed.

Actions and effects of the embodiment explained above will be explained.

According to the operation device 10 of the embodiment, when the operator displaces the operation member 11, displacement in two directions perpendicular to each other is transmitted to each of the pair of one-dimensional support mechanisms 12, 13 that supports the operation member 11. The displacement of the operation member 11 transmitted to the pair of one-dimensional support mechanisms 12, 13 is output as the command signal according to the displacement of the operation member 11 of the respective one-dimensional support mechanisms 12, 13. Biasing forces toward the neutral position of the displacement by the respective one-dimensional support mechanisms 12, 13 are applied to the operation member 11 by the pair of potentiometers 14, 15.

When either one of the two directions displaceably supported by the pair of one-dimensional support mechanisms 12, 13 is included in displacement directions of the operation member 11 by the operator, the biasing force along the one direction is applied to the operation member 11. Similarly, when the other of the above-mentioned two directions is included in the displacement directions of the operation member 11 by the operator, the biasing force along the other direction is applied to the operation member 11. By these biasing forces, the operator can individually recognize the displacement direction of the operation member 11 in relation to each of the two directions where the operation member 11 is displaceably supported. Consequently, when the operator wants to displace the operation member 11 only in either one of the above-mentioned two directions, he can displace the operation member 11 in a desired direction while adjusting a displacement state of the operation member 11 so that the biasing force along the other direction is not applied to the operation member 11.

As described above, according to the operation device 10 of the embodiment, when the command signal is output by displacing the operation member 11 in two directions perpendicular to each other, the operator can individually recognize the displacement of the operation member 11 toward each direction to thereby enhance operability.

In the operation device 10 of the embodiment, the biasing forces that the potentiometers 14, 15 apply to the operation member 11 against the displacement of the operation member 11 are different from each other. Specifically, the biasing force that the potentiometer 14 applies to the operation member 11 against the displacement in the vehicle-width direction of the operation member 11 is larger than the biasing force that the potentiometer 15 applies to the operation member 11 against the displacement in the travel direction of the operation member 11.

In a manner as described above, the operator can displace the operation member 11 in the travel direction more easily than in the vehicle-width direction. Accordingly, the speed command signal along the travel direction is emphasized more than the steering command signal according to the displacement in the vehicle-width direction, and output stability (straight advance stability) of the command signal according to the displacement in the travel direction can be enhanced.

In the operation device 10 of the embodiment, the one-dimensional support mechanism 12 is provided with: the roll rail 12*a* (rail member) that extends along the vehicle-width direction; and the roll slide 12*b* and the roll cap 12*c* that are attached to the operation member 11 and are movably attached to the roll rail 12*a*, and the roll rail 12*a* transmits displacement along the vehicle-width direction of the operation member 11 to the potentiometer 14.

In a manner as described above, the operator can transmit the displacement of the operation member 11 to the two-dimensional support mechanism by linearly moving the operation member 11 along the vehicle-width direction.

In the operation device 10 of the embodiment, the one-dimensional support mechanism 13 is provided with the pitch plate 13*b* and the pitch cover 13*c* (swing member) that swingably support the roll rail 12*a* around the axis line X2 parallel to the roll rail 12*a*.

In a manner as described above, the roll rail 12*a* is swung around the axis line X2 (swing shaft) parallel to the roll rail 12*a* while linearly moving the operation member 11 in a direction along the roll rail 12*a*, and thereby the operation member 11 can be individually displaced in the crossing two directions.

In the embodiment, the biasing force that the potentiometer 14 biasing the operation member 11 in the direction along the roll rail 12*a* applies to the operation member 11 against the displacement of the operation member 11 is larger than the biasing force that the potentiometer 15 biasing the pitch plate 13*b* and the pitch cover 13*c* in a swing direction of the roll rail 12*a* applies to the operation member 11 against the displacement of the operation member 11.

In a manner as described above, it becomes easy for the operator to displace the operation member 11 in the swing direction of the roll rail 12*a*, and it becomes hard for the operator to displace the operation member 11 in the direction along the roll rail 12*a*. Accordingly, output stability of the speed command signal along the swing direction of the roll rail 12*a* can be enhanced.

<Other Embodiment>

Although in the above-mentioned embodiment, magnitude of the biasing forces that the respective potentiometers 14, 15 generate to the swing members 14*c*, 15*c* is the same, it may be different from each other.

Although in the above-mentioned embodiment, the handles 24, 25 are arranged at both sides of the operator in the state where he is sitting on the seat 23, other aspect may be employed. For example, a handle may be arranged only at either side of the operator. In this case, the operation device 10 is attached to a tip of the handle arranged at the side.

Although in the above-mentioned embodiment, the potentiometers 14, 15 have the built-in springs that generate the biasing forces biasing the operation member 11 to the neutral position, other aspect may be employed. For example, a pair of biasing mechanisms that generates biasing forces biasing the operation member 11 in two directions (the travel direction and the vehicle-width direction), respectively toward the neutral position may be provided as mechanisms separately from the potentiometers 14, 15.

The invention claimed is:

1. An operation device comprising:

an operation member displaceable by an operator;

a two-dimensional support mechanism in which a pair of one-dimensional support mechanisms that individually displaceably supports the operation member in mutually crossing two directions are connected in series; and a pair of biasing mechanisms that individually biases the operation member toward a neutral position of displacement by each of the one-dimensional support mechanisms, wherein biasing forces that the pair of biasing mechanisms applies to the operation member against displacement of the operation member are different, and wherein a command signal according to the displacement of the operation member of each of the one-dimensional support mechanisms is output, wherein one of the one-dimensional support mechanisms includes a rail member that linearly movably supports the operation member along either of the two directions, wherein the other one-dimensional support mechanism includes a swing member that swingably supports the rail member around an axis line parallel to the rail member, wherein the biasing force that the one biasing mechanism biasing the operation member in a direction along the rail member applies to the operation member against the displacement of the operation member is larger than the biasing force that the other biasing mechanism biasing the swing member in a swing direction of the rail member applies to the operation member against the displacement of the operation member.

2. The operation device according to claim 1, wherein the two directions are a travel direction and a vehicle-width direction of an electric mobility provided with at least one electric drive wheel, and wherein the command signal is a signal to command a travel speed and a steering direction of the electric mobility.

3. An electric mobility comprising:

the operation device according to claim 2;

a rear wheel and a front wheel that are arranged to be spaced apart from each other in the travel direction, and at least either of which is an electric drive wheel;

a vehicle body frame that rotatably supports the front wheel and the rear wheel around each axle;

a seat that is attached to the vehicle body frame, and is arranged above a position adjacent to the rear wheel, the position being located between the front wheel and the rear wheel; and a handle that is attached to the vehicle body frame, and is arranged at a side of the operator in a state where he is sitting on the seat, wherein the operation device is provided at the handle.

* * * * *